United States Patent [19]

Brooksbank

[11] 4,311,756
[45] Jan. 19, 1982

[54] LEATHER BELTS OR APRONS FOR TEXTILE MACHINES

[76] Inventor: Wallace R. Brooksbank, Embsay Tannery, Skipton, County of York, England

[21] Appl. No.: 217,835

[22] Filed: Dec. 18, 1980

[30] Foreign Application Priority Data

Dec. 18, 1979 [GB] United Kingdom ............... 43467/79

[51] Int. Cl.³ .................. B32B 3/00; B32B 3/02; B32B 5/20; B32B 9/02
[52] U.S. Cl. .................................. 428/282; 428/57; 428/60; 428/280; 428/423.4; 428/473; 428/311.1; 428/317.7; 474/254; 474/269; 428/318.6; 428/318.4
[58] Field of Search ................ 428/57, 58, 60, 61, 428/280, 282, 310, 315, 473, 423.4; 474/254, 269

[56] References Cited

U.S. PATENT DOCUMENTS

| | | | |
|---|---|---|---|
| 3,480,457 | 11/1969 | Starkweather, Jr. et al. | 428/473 |
| 3,713,938 | 1/1973 | Sutton | 428/473 |
| 3,761,304 | 9/1973 | Hansson | 428/423.4 |
| 4,061,803 | 12/1977 | Brooksbank et al. | 427/323 |
| 4,218,505 | 8/1980 | Shiga et al. | 428/473 |
| 4,268,580 | 5/1981 | Rock et al. | 428/423.4 |

*Primary Examiner*—William J. Van Balen
*Attorney, Agent, or Firm*—Norris & Bateman

[57] ABSTRACT

The invention relates to a belt or apron for textile machines comprising a layer or lamination of a belt or apron as covered by U.S. Pat. No. 4,061,803 superimposed upon and bonded to a ply of resilient cellular polyurethane felt-like material.

4 Claims, 4 Drawing Figures

LEATHER BELTS OR APRONS FOR TEXTILE MACHINES

This invention relates to improvements in leather belts or aprons particularly for textile machines.

In the specification of U.S. Pat. No. 4,061,803 there is described a method for producing a leather belt or apron for conveying fibres on textile machines by retaining intact or substantially intact the natural inner or flesh surface of the leather comprising removing all or part of the natural smooth grain surface from the leather to leave an intermediate surface exposed, subjecting the intermediate surface to mechanised treatment by setting and or rolling to compact the surface fibres and impregnating the surface with a polymeric material to consolidate the intermediate surface layer and produce a belt or apron with a smooth flexible non-tacky surface.

The belts or aprons are driven and gripped by or caused to run around or between fluted rollers in the course of transporting and gripping fibres on machines for combing or gilling such fibres and are constructed with the inner part of the belt comprising an intact or substantially intact natural inner or flesh surface of leather has proved suprisingly advantageous in use. The retention of the intact or substantially intact natural flesh layer of leather whilst still allowing sufficient elastic stretch for the belt or apron to conform to the fluted rollers, does not allow excessive permanent stretch which would result in unacceptable narrowing of the belt apron.

Thus a belt or apron capable of much improved dimensional stability has been produced. Furthermore because of the presence of this natural flesh layer of leather throughout a level belt or apron it is no longer necessary to employ leather which has to be specially tanned and produced by expensive chemical and mechanical processes designed to improve dimensional stability whilst retaining flexibly. Such processes have never produced a fully satisfactory end result. Leather produced by simpler less expensive methods may now be used provided it has a suitable fat content.

There is however one disadvantage to this belt or apron that occasionally the face surface becomes roughened by passing over or through fluted rollers causing fibres carried by the belt or apron to become entangled by the roughened surface.

The object of the invention is to provide a surface layer on the belt or apron resistant to damage by the fluted rollers. According to the invention a belt or apron for conveying or processing textile fibres in which the belt or apron passes over or between fluted rollers comprises two or more plies or layers adhesively bonded together by a polyurethane adhesive, one ply or layer being of leather hide having a surface of the fleshy portion of the hide impregnated with a polymeric material to provide a stable tear resistant inner surface and the other outer surface ply or plies being of felt-like material.

The invention will be described with reference to the accompanying drawings.

Figure 1:
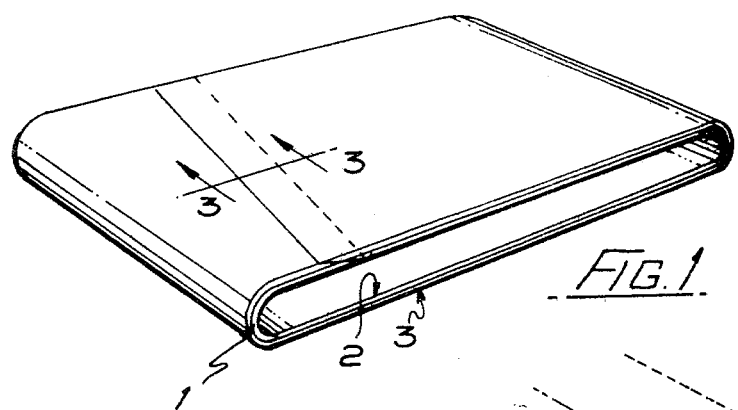
FIG. 1 is a perspective view of an endless belt or apron.
Figure 2:
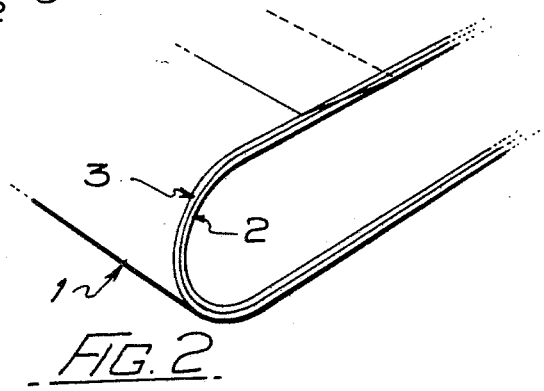
FIG. 2 is an enlarged perspective view showing the joint rendering the belt or apron endless.

An endless belt or apron 1 for conveying fibres on textile machines is formed of two or more plies, an inner ply or layer 2 of leather and an outer ply or plies 3 of felt or a non-fibrous polyurethane material.

The belt or apron 1 passes over and between fluted rollers 4. The ply or layer 2 is as formed and described in the specification of U.S. Pat. No. 4,061,803 from the fleshy side of a hide and is laminated to the outer ply 3.

The ply or layer 3 is formed from felt reinforced by a polyurethane foam or from a non-fibrous polyurethane material such as that sold under the Registered Trade Mark Porvair.

Figure 3:
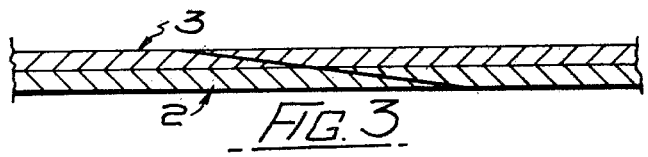
FIG. 3 is a section on line 3—3 of FIG. 1.
Figure 4:
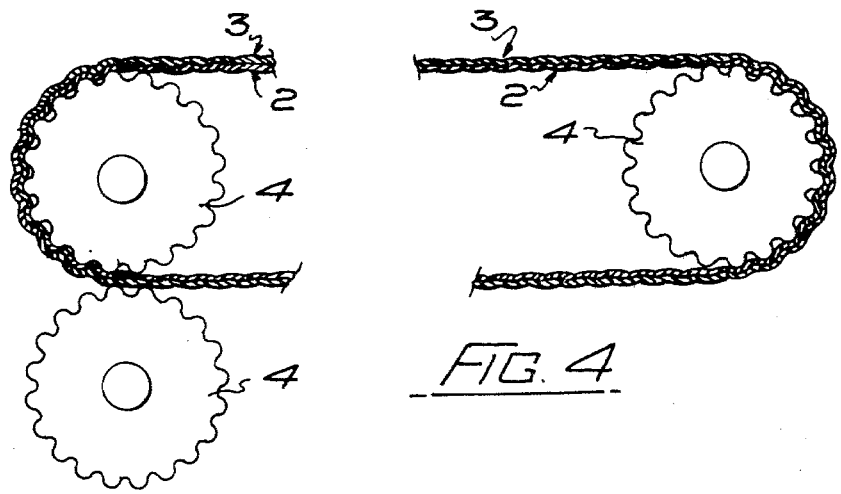
FIG. 4 is a side elevation of the belt or apron mounted on fluted rollers.

In manufacturing the belt or apron a sheet of leather produced as hereinbefore referred to is bonded by a polyurethane adhesive to a sheet of felt reinforced by polyurethane foam and is then cut into strips of a length or width for a particular belt. The ends of the laminations are then chamferred as shown in FIG. 3 and bonded together by a polyurethane adhesive to form a scarf joint 4 without adding to the thickness of the belt.

The leather ply or layer gives stability and strength to the belt and the felt or the non-fibrous polyurethane material provide the surface ply or layer which is resistant to cracking or roughening when the belt becomes corrugated after repeated passages over the fluted rollers.

The material or materials from which the outer layer or ply 3 is formed are those which if employed by themselves in the best thickness to accommodate such flexing stretching and moulding would not possess the tear resistance or dimensional stability necessary to provide a reliable belt or apron.

Such materials may be rubberlike or plastics materials of solid or cellular construction, textile material such as felts or combinations of textile fibres and plastics or rubberlike materials which have high flex and abrasion resistance. Some materials which present working surfaces capable of transporting certain fibres satisfactorily are films or plies of cast solid or cellular polyurethane such as these sold under the following Registered trade Marks Unileaf, Porvair, or felt-like materials of which fibre reinforced polymeric materials such as those sold under the Registered Trade Mark Corfam, Clarino etc, have been found the most suitable.

Some of these materials are fibre reinforced foams whilst others are impregnated felts.

These materials when superimposed upon a ply consisting of the substantially intact natural flesh surface of leather will generally not exceed 2.5 mm in thickness and will be adhesively secured to the intermediate surface of the leather which has been prepared by roughening the leather fibres. The leather should have a minimum fat content in order to ensure satisfactory wearing qualities and it is therefor essential that the adhesive employed as well as being extremly flexible after curing must create a good bond with the relatively greasy leather.

Polyurethane adhesives have been found most suitable for this purpose.

Each ply may have more than one joint within each belt or apron for economic or other reasons, the scarf joints being made with similar flexible and grease resisting polyurethanes adhesives to those used for laminating the two or more plies of material together.

The width of the endless belt or apron are usually 17 inches to 25 inches but may be narrowed when used on an old machine, and is normally greater than the internal radius of the rollers. More than one layer of the surface lamination may be employed to provide additional thickness.

What I claim is:

1. A belt or apron for conveying or processing textile fibres in which the belt or apron passes over or between fluted rollers comprising two or more plies or layers adhesively bonded together by a polyurethane adhesive, the inner ply or layer being of leather hide having a surface of the fleshy portion of the hide impregnated with a polymeric material to provide a stable, tear resistant inner surface and the other outer surface ply or plies being of a felt like material capable of being flexed or stretched without premature cracking or rupture.

2. A belt or apron as in claim 1 in which the outer ply or layer is of a felt impregnated or reinforced with polyurethane foam.

3. A belt or apron as in claim 1, in which the outer ply or layer is of a non-fibrous polyurethane material.

4. A belt or apron as in claim 1, in which the width of the belt is greater than the diameter of the fluted rollers.

* * * * *